US011199971B2

(12) United States Patent
Chen et al.

(10) Patent No.: US 11,199,971 B2
(45) Date of Patent: Dec. 14, 2021

(54) MANAGING OPERATIONAL PARAMETERS FOR MIGRATING DATA FOR RESIZED VOLUMES

(71) Applicant: Amazon Technologies, Inc., Reno, NV (US)

(72) Inventors: Tao Chen, Sammamish, WA (US); Marc John Brooker, Seattle, WA (US); Haijun Zhu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/184,256

(22) Filed: Jun. 16, 2016

(65) Prior Publication Data

US 2016/0299695 A1    Oct. 13, 2016

Related U.S. Application Data

(63) Continuation of application No. 14/659,193, filed on Mar. 16, 2015, now abandoned, which is a
(Continued)

(51) Int. Cl.
*G06F 3/06* (2006.01)
*G06F 11/20* (2006.01)
*G06F 11/14* (2006.01)

(52) U.S. Cl.
CPC .......... *G06F 3/0607* (2013.01); *G06F 3/0604* (2013.01); *G06F 3/065* (2013.01);
(Continued)

(58) Field of Classification Search
None
See application file for complete search history.

(56) References Cited

U.S. PATENT DOCUMENTS 6,938,039 B1 * 8/2005 Bober .............. G06F 17/30079
707/704
7,054,943 B1 * 5/2006 Goldszmidt ............ G06F 9/505
370/231

(Continued)

OTHER PUBLICATIONS

U.S. Notice of Allowance dated Nov. 21, 2014 issued in U.S. Appl. No. 13/775,001.
(Continued)

*Primary Examiner* — Jared I Rutz
*Assistant Examiner* — Marwan Ayash
(74) *Attorney, Agent, or Firm* — Hogan Lovells US LLP

(57) ABSTRACT

Customers of shared resources in a multi-tenant environment can modify operational parameters of electronic resources. A customer can be provisioned a data volume of a specified size, storage type (e.g., hard disk drive or solid state device), committed rate of input/output operations per second, and/or geographical location, for example. The customer can subsequently modify any such operational parameters by submitting an appropriate request, or the operational parameters can be adjusted automatically based on any of a number of criteria. Data volumes for the customer can be migrated, split, or combined in order to provide the shared resources in accordance with the modified operational parameters.

20 Claims, 8 Drawing Sheets

Related U.S. Application Data continuation of application No. 13/775,001, filed on Feb. 22, 2013, now Pat. No. 8,984,243.

(52) U.S. Cl.
CPC ............ *G06F 3/067* (2013.01); *G06F 3/0619* (2013.01); *G06F 3/0631* (2013.01); *G06F 3/0647* (2013.01); *G06F 3/0665* (2013.01); *G06F 3/0683* (2013.01); *G06F 11/14* (2013.01); *G06F 11/2069* (2013.01); *G06F 11/2071* (2013.01); *G06F 11/1456* (2013.01); *G06F 11/2058* (2013.01)

(56) References Cited

U.S. PATENT DOCUMENTS

| | | | |
|---|---|---|---|
| 7,383,381 | B1 | 6/2008 | Faulkner et al. |
| 8,335,765 | B2 | 12/2012 | Sivasubramanian |
| 8,935,498 | B1* | 1/2015 | Natanzon ............ G06F 11/2087 711/165 |
| 9,021,200 | B1* | 4/2015 | Kushmerick ......... G06F 3/0689 711/114 |
| 9,128,942 | B1* | 9/2015 | Pfau ........................ G06F 16/13 |
| 2003/0033494 | A1 | 2/2003 | Fujibayashi |
| 2004/0024961 | A1* | 2/2004 | Cochran ............. G06F 11/1466 711/112 |
| 2004/0133622 | A1* | 7/2004 | Clubb .................... G06F 9/505 709/200 |
| 2005/0076154 | A1 | 4/2005 | Chambliss et al. |
| 2009/0198949 | A1* | 8/2009 | Kuligowski .......... G06F 3/0605 711/203 |
| 2010/0036851 | A1 | 2/2010 | Paterson-Jones |
| 2010/0257328 | A1* | 10/2010 | Liu ....................... G06F 3/0617 711/162 |
| 2010/0281151 | A1 | 11/2010 | Ramankutty |
| 2011/0099147 | A1* | 4/2011 | McAlister ........... G06F 11/2076 707/639 |
| 2011/0238546 | A1* | 9/2011 | Certain .................. G06Q 10/00 705/34 |
| 2011/0238857 | A1* | 9/2011 | Certain ................. G06F 9/5044 709/232 |
| 2012/0331260 | A1 | 12/2012 | Arroyo |
| 2014/0059307 | A1* | 2/2014 | Blea .................... G06F 11/1451 711/162 |
| 2015/0186064 | A1 | 7/2015 | Chen et al. |

OTHER PUBLICATIONS

U.S. Non-Final Office Action dated Apr. 10, 2015 issued in U.S. Appl. No. 14/659,193.
Final Rejection issued in U.S. Appl. No. 14/659,193, dated Dec. 29, 2016.
Non-Final Rejection issued in U.S. Appl. No. 14/659,193, dated Dec. 7, 2017.
Final Rejection issued in U.S. Appl. No. 14/659,193, dated Sep. 4, 2018.
Non-Final Rejection issued in U.S. Appl. No. 14/659,193, dated Jun. 12, 2019.
Final Rejection issued in U.S. Appl. No. 14/659,193, dated Nov. 27, 2019.
Non-Final Rejection issued in U.S. Appl. No. 14/659,193, dated Oct. 6, 2020.

* cited by examiner

MANAGING OPERATIONAL PARAMETERS FOR MIGRATING DATA FOR RESIZED VOLUMES

CROSS-REFERENCE TO RELATED APPLICATIONS

This application is a continuation of U.S. patent application Ser. No. 14/659,193, entitled "MANAGING OPERATIONAL PARAMETERS FOR COPIES OF DATA STORAGE INSTANCES IN NETWORK ENVIRONMENTS" filed Mar. 16, 2015, now abandoned, which is a continuation of issued U.S. Pat. No. 8,984,243, issued Mar. 17, 2015, which are incorporated herein by reference for all purposes.

BACKGROUND

As an increasing number of applications and services are being made available over networks such as the Internet, more and more content, application, and/or service providers are turning to technologies such as remote resource sharing or "cloud computing." Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In some environments, multiple users can share resources such as data repositories, wherein the users can concurrently send multiple read and/or write requests to be executed against the users' respective volumes within the same data repository. Problems can arise, however, when a user desires to modify operational parameters associated with the user's allocation of the shared resources. For example, the user's storage needs may exceed the user's allocated storage capacity on the shared resource. Certain approaches enable a user to add new volumes to supply the user's need for additional storage capacity or to self-administer migration of data to a larger volume. Such techniques, however, can result in additional complexity to user application logic and increased latency such as to manage data across multiple volumes or to migrate data across remote data stores and/or data stores having higher latency. For instance, a user application that creates a large data file may run up against storage limits during such a process. If the user wishes to add additional volumes when storage capacity is close to being exceeded or when storage capacity has been exceeded, the user may be required to include complex application logic such as partitioning the data file into several smaller data segments and distributing the segments across several volumes. In addition, data overhead may be required to keep track of the distributed data segments.

BRIEF DESCRIPTION OF THE DRAWINGS

Various embodiments in accordance with the present disclosure will be described with reference to the drawings, in which.

DETAILED DESCRIPTION

Figure 1:
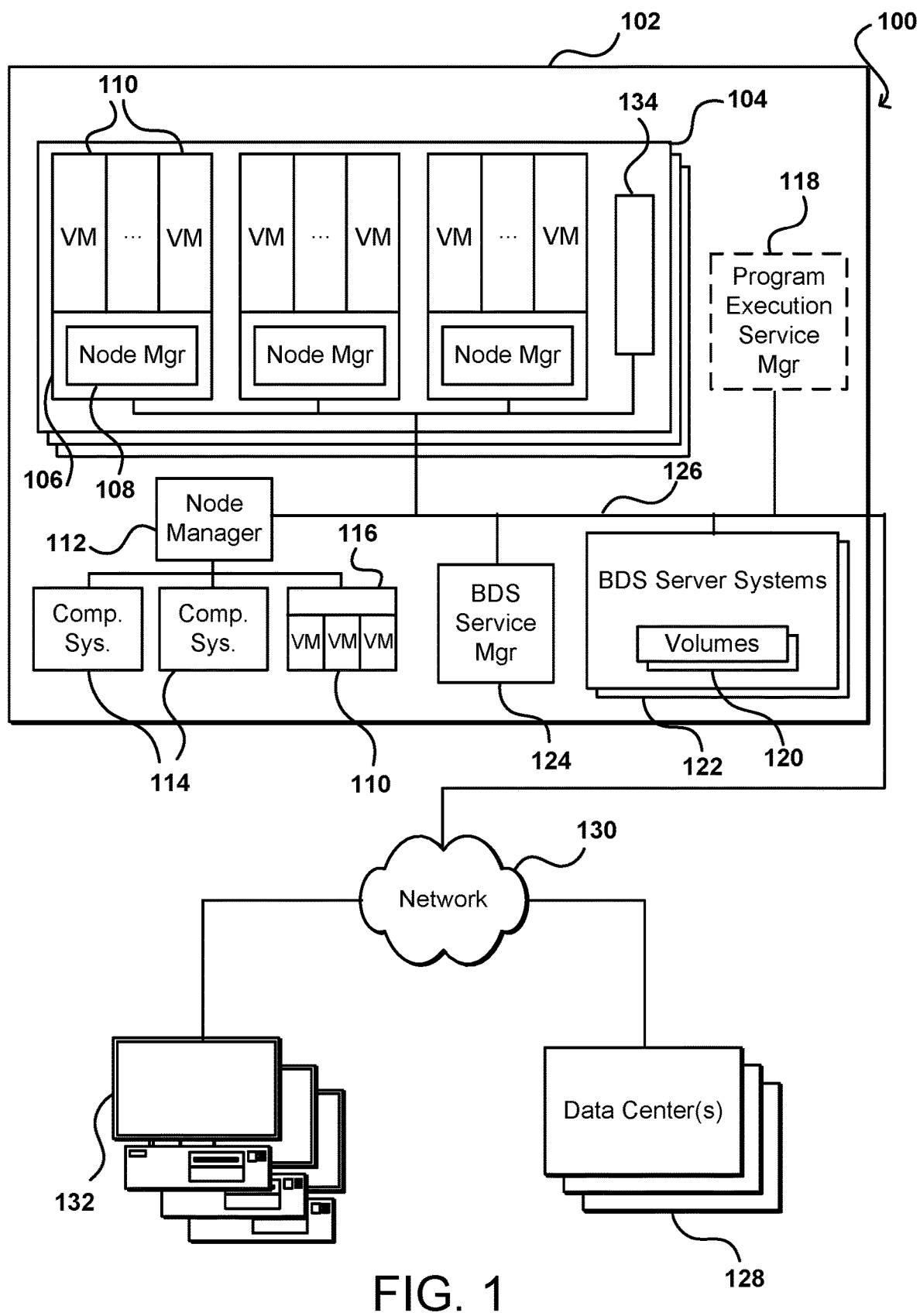
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of resource sharing and allocation in an electronic environment. In particular, various embodiments enable a user to set and/or modify operational parameters of one or more electronic resources provisioned to the user with minimal effort on the part of the user, and without unduly disrupting applications, programs, or services relying on the provisioned resources. For example, the user can request to adjust the storage capacity of an in-use data volume upward or downward depending upon various scenarios. In some embodiments, because the user can be charged a fee based upon the amount of storage provisioned for the user, the user can decrease her costs by resizing a provisioned volume to a smaller size if the user does not expect to utilize all of the allocated data storage space. In other embodiments, the user can modify an active data volume to be a greater size to meet increased data storage requirements. In still other embodiments, the user can dynamically modify other operational parameters of one or more provisioned data volumes, such as data storage type (e.g., hard disk drive (HDD) or solid state device (SSD)), a level of expected performance (e.g., rate of input/output operations per seconds (IOPS), throughput, and/or bandwidth), and/or a geographical location.

The amount of a resized data volume can be any appropriate amount, and the level of performance associated with the resized data volume can be maintained, enhanced, or decreased depending upon user specification and/or the availability of resources. Multiple customers can be assigned to a single resource, such as a data server, with each of the customers being allocated one or more data volumes of the shared resource. While the term "customer" is used herein to refer to the "owner" of specific data, or a data store or instance hosted by the system, it should be understood that the term customer is used merely for convenience, and that any appropriate user or developer can be allowed to access the control plane and data plane in the various embodiments.

In various embodiments, customers requesting a volume of a specified size and/or rate commitments that cannot be provided by a single available resource can have the requested resource spread across multiple systems. The multiple systems can provide data storage capacity totaling the amount requested, and/or the multiple systems can be combined or striped to provide a guaranteed level of performance (e.g., rate commitments), which can be a percentage or portion of the total amount available on each of the systems, the full amount available, or in some cases greater than the total amount. For example, since customers often will not request for all of the data storage capacity available on a system, certain resources can operate at levels of performance greater than specified rates. Other customers can be provisioned on those resources as well. In addition, the other customers can be allocated to certain shared resources to complement utilization patterns by customers already allocated on the resources. For example, one customer's usage may require large data storage capacity but limited access to the data. Another user may have an application having limited data needs but requires extensive performance requirements (e.g., IOPS, MB/s). While in a conventional system such users may be required to be provisioned onto separate systems to fulfill their respective data storage capacity and other resource requirements, various embodiments allow the users to share a resource and spread the costs of sharing the resource. As another example, one user may require a guaranteed level of I/O performance and/or bandwidth during peak business hours and can be provisioned onto a system providing the guaranteed level of performance during that period. Other users that have applications that run I/O-heavy background processes during off-peak hours can be provisioned onto the same system, thus better distributing the resources required for multiple users' various workloads.

One approach for modifying operational parameters of provisioned data volumes, such as adding storage capacity, is to instantiate new data volumes, and mounting or attaching the new volumes to one or more programs executing on behalf of a user. However, such a technique may not be ideal for some users. For example, a user application may have to be reconfigured to handle data that is distributed across several volumes. In addition to increasing complexity of the user application and introducing user error and/or data inconsistency if incorrectly implemented, this approach can increase latency because data may reside on different systems as a result of spinning new data volumes. Moreover, additional data overhead, such as metadata, may also be required to track segmented data. Another approach for adjusting the characteristics of provisioned data volumes is to self-administer migration of a current active volume to a new volume having the desired characteristics. Such a method may also be unsuitable for users. In certain systems, a customer desiring to modify a current volume of block storage data using this technique may be required to copy the data from the current volume to remotely located data stores or data stores of a different type having higher latency, and copy the data from the remotely located data stores or the higher-latency data stores to create a new volume having the desired modification(s). In the meantime, read/writes to the current volume may be blocked while this process is underway, which can result in the unavailability of a user application requiring access to the volume for an extensive period of time. Using approaches of the various embodiments, a customer can modify operational parameters of provisioned data volumes while minimizing disruption of access to the provisioned volumes.

Systems and methods in accordance with embodiments can automatically (utilizing algorithms and/or appropriate logic executed by at least one computing device) migrate data volumes, adjust resource commitments, and handle other such tasks pertaining to a request to modify operational parameters of provisioned data volumes. In some embodiments, a customer might request a change in data storage capacity or a level of performance, or the system or service might determine that a change in capacity or performance is to be executed. In accordance with various embodiments, suitable resources can be located and allocated automatically to provide the user with provisioned volumes having desired operational parameters, without the customer having to adjust or change any configuration settings, applications, etc., in order to effect the change. Data volumes can be migrated, split, combined, or otherwise manipulated in accordance with various embodiments, depending at least in part upon the requested adjustments. Changes can be managed from a control plane, for example, with appropriate calls being made into the data plane.

FIG. 1 illustrates an example network configuration 100 in which multiple computing systems are operable to execute various programs, applications, and/or services, and further operable to access reliable non-local block data storage, such as under the control of a block data storage (BDS) service and/or program execution service, in accordance with various embodiments. In particular, a program execution service manages the execution of programs on various host computing systems located within a data center 102, and a BDS service uses multiple BDS server systems 122 at the data center to provide reliable non-local block data storage to those executing programs. Multiple remote archival storage systems (not shown) external to the data center may also be used to store additional copies of some portions of some BDS volumes.

In this example, a data center 102 includes a number of racks, each rack 104 including a number of host computing devices 106, as well as an optional rack support computing system 134. The host computing systems 106 on the illustrated rack 104 each host one or more virtual machines 110 in this example, as well as a node manager 108 associated with the virtual machines on that host computing system to manage those virtual machines. One or more other host computing systems 116 may also each host one or more virtual machines 110 in this example. Each virtual machine 110 may act as an independent computing node for executing one or more program copies (not shown) for a user (not shown), such as a customer of the program execution service. In addition, this example data center 102 further includes additional host computing systems 114 that do not include virtual machines, but may nonetheless each act as a computing node for one or more programs (not shown) being executed for a user. In this example, a node manager 112 executing on a computing system (not shown) distinct from the host computing systems 114 and 116 is associated with those host computing systems to manage the computing nodes provided by those host computing systems, such as in a manner similar to the node managers 108 for the host computing systems 106. The rack support computing system 134 may provide various utility services for other computing systems local to its rack 104 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system is also illustrated that executes a program execution service manager 118 for the program execution service to assist in managing the execution of programs on the computing nodes provided by the host computing systems located within the data center 102 (or optionally on computing systems located in one or more other data centers 128, or other remote computing systems 132 external to the data center). As discussed in greater detail elsewhere, a program execution service manager may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the program execution service manager 118 may coordinate with the node managers 108 and 112 to manage program execution on computing nodes associated with the node managers, while in other embodiments the node manager may not assist in managing such execution of programs.

In this example, the data center 102 also includes a BDS service manager 124 for managing the availability of non-local block data storage to programs executing on computing nodes provided by the host computing systems located within the data center (or optionally on computing systems located in one or more other data centers 128, or other remote computing systems 132 external to the data center). In particular, in this example, the data center 102 includes a pool of multiple BDS server systems 122, which each have local block storage for use in storing one or more volume copies 120. Access to the volume copies 120 is provided over the internal network(s) 126 to programs executing on various computing nodes 110 and 114. As discussed in greater detail elsewhere, a BDS service manager may provide a variety of services related to providing non-local block data storage functionality, including the management of user accounts (e.g., creation, deletion, billing, etc.); the creation, use and deletion of BDS volumes and snapshot copies of those volumes; the collection and processing of performance and auditing data related to the use of BDS volumes and snapshot copies of those volumes; the obtaining of payment from customers or other users for the use of BDS volumes and snapshot copies of those volumes; etc. In some embodiments, the BDS service manager may coordinate with the node managers to manage use of volumes by programs executing on associated computing nodes, while in other embodiments the node managers may not be used to manage such volume use. In addition, in other embodiments, one or more BDS service managers may be structured in other manners, such as to have multiple instances of the BDS service manager executing in a single data center (e.g., to share the management of non-local block data storage by programs executing on the computing nodes provided by the host computing systems located within the data center), and/or such as to have at least some of the functionality of a BDS service manager being provided in a distributed manner by software executing on some or all of the BDS server systems 122 (e.g., in a peer-to-peer manner, without any separate centralized BDS service manager).

In this example, the various host computing systems, BDS server systems, and computing systems are interconnected via one or more internal networks 126 of the data center 102, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the BDS service). In addition, one or more of the other computing systems may be archival storage systems (e.g., as part of a remote network-accessible storage service) with which the BDS service may interact, such as under control of one or more archival managers (not shown) that execute on the one or more other computing systems or instead on one or more computing systems of the data center, as described in greater detail elsewhere. Furthermore, while not illustrated here, in some embodiments, some of the BDS server systems 122 may further be interconnected with one or more other networks or other connection mediums, such as a high-bandwidth connection over which the server storage systems 122 may share volume data (e.g., for purposes of replicating copies of volumes and/or maintaining consistency between primary and mirror copies of volumes), with such a high-bandwidth connection not being available to the various host computing systems in such embodiments.

It will be appreciated that the example of FIG. 1 has been simplified for the purposes of explanation, and that the number and organization of host computing systems, BDS server systems, and other devices may be much larger than what is depicted in FIG. 1. For example, as one illustrative embodiment, there may be approximately 4,000 computing systems per data center, with some of those computing systems being host computing systems that may each host fifteen virtual machines, and/or with some of those computing systems being BDS server systems that may each store several volume copies. If each hosted virtual machine executes one program, then such a data center may execute as many as sixty thousand program copies at one time. Furthermore, hundreds or thousands (or more) volumes may be stored on the BDS server systems, depending on the number of server storage systems, size of the volumes, and number of mirror copies per volume. It will be appreciated that in other embodiments, other numbers of computing systems, programs and volumes may be used.

Figure 2:
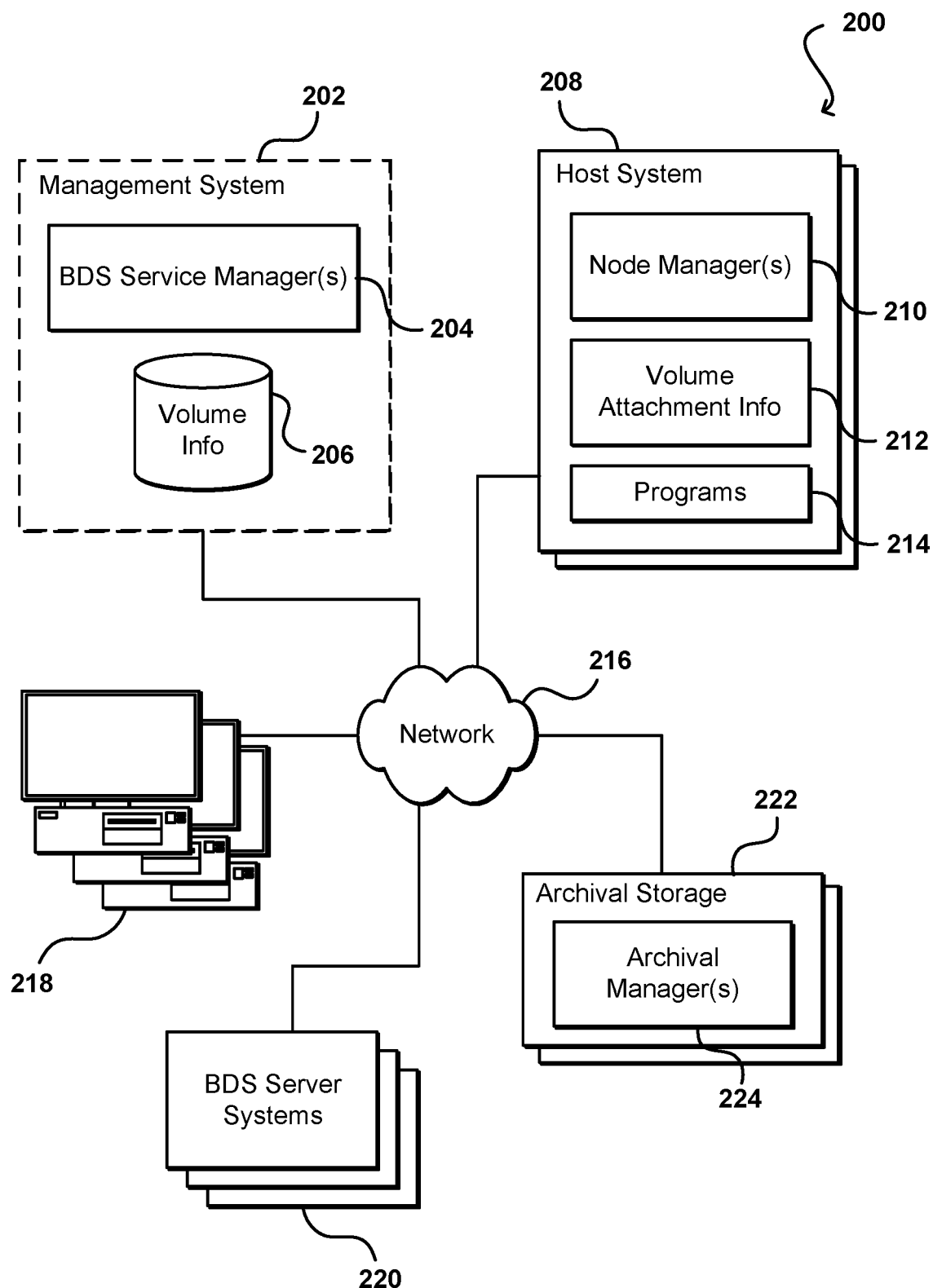
FIG. 2 illustrates an example separation of management and host components that can be used in accordance with various embodiments.

FIG. 2 illustrates an example environment 200 including computing systems suitable for managing the provision and use of reliable non-local block data storage functionality to clients that can be implemented in accordance with various embodiments. In this example, a management system 202, such as one or more server computers including one or more externally-facing customer interfaces, is programmed to execute a BDS service manager 204 to manage provisioning of non-local block data storage functionality to programs executing on host computing systems 208 and/or on at least some other computing systems 218, such as to BDS volumes (not shown) provided by the BDS server systems 220. Each of the host computing systems 208 in this example also executes a node manager 210 to manage access of programs 214 executing on the host computing system to at least some of the non-local BDS volumes, such as in a coordinated manner with the BDS service manager 204 over a network 216 (e.g., an internal network of a data center, not shown, that includes the computing systems 202, 208, 220, and optionally at least some of the other computing systems 218). In other embodiments, the node managers 210 may instead manage one or more other computing systems (e.g., the other computing systems 218).

In addition, multiple BDS server systems 220 are illustrated that each can store some of the non-local BDS volumes (not shown) used by the executing programs 214, with access to those volumes also provided over the network 216 in this example. One or more of the BDS server systems 220 may also each store a server software component (not shown) that manages operation of one or more of the BDS server systems, as well as various information (not shown) about the data that is stored by the BDS server systems. Thus, in at least some embodiments, the server computing system 202 of FIG. 2 may correspond to the computing system 124 of FIG. 1, one or more of the node managers 108 and 112 of FIG. 1 may correspond to the node managers 210 of FIG. 2, and/or one or more of the server block data storage computing systems 220 of FIG. 2 may correspond to BDS server systems 122 of FIG. 1. In addition, in this example embodiment, multiple archival storage systems 222 are illustrated, which may store snapshot copies and/or other copies of at least portions of at least some BDS volumes stored on the BDS server systems 220. The archival storage systems 222 may also interact with some or all of the computing systems 202, 208, and 220, and in some embodiments may be remote archival storage systems (e.g., of a remote storage service, not shown) that interact with the computing systems over one or more other external networks (not shown).

The other computing systems 218 may further include other proximate or remote computing systems of various types in at least some embodiments, including computing systems via which customers or other users of the BDS service interact with the management and/or host systems. Furthermore, one or more of the other computing systems 218 may further execute a program execution service manager to coordinate execution of programs on the host computing systems 208 and/or other host computing systems 218, or the management system 202 or one of the other illustrated computing systems may instead execute such a program execution service manager, although a program execution service manager is not illustrated in this example.

In the illustrated embodiment, a node manager 210 is executing in memory in order to manage one or more other programs 214 executing in memory on the computing system, such as on behalf of customers of the program execution service and/or BDS service. In some embodiments, the computing systems 208 may host multiple virtual machines, and if so, each of the executing programs 214 may be an entire virtual machine image (e.g., with an operating system and one or more application programs) executing on a distinct hosted virtual machine computing node. The node manager 210 may similarly be executing on another hosted virtual machine, such as a privileged virtual machine monitor that manages the other hosted virtual machines. In other embodiments, the executing program copies 214 and the node manager 210 may execute as distinct processes on a single operating system (not shown) executed on a single computing system 208.

The archival storage system 222 is operable to execute at least one archival manager 224 in order to manage operation of one or more of the archival storage systems, such as on behalf of customers of the BDS service and/or of a distinct storage service that provides the archival storage systems. In other embodiments, the archival manager(s) 224 may instead be executing on another computing system, such as one of the other computing systems 218 or on the management system 202 in conjunction with the BDS service manager 204. In addition, while not illustrated here, in some embodiments, various information about the data that is stored by the archival storage systems 222 may be maintained in storage for the archival storage systems or elsewhere.

The BDS service manager 204 and node managers 210 may take various actions to manage the provisioning and/or use of reliable non-local block data storage functionality to clients (e.g., executing programs), as described in greater detail elsewhere. In this example, the BDS service manager 204 may maintain a database 206 that includes information about volumes stored on the BDS server systems 220 and/or on the archival storage systems 222 (e.g., for use in managing the volumes), and may further store various other information (not shown) about users or other aspects of the BDS service. In other embodiments, information about volumes may be stored in other manners, such as in a distributed manner by node managers 210 on their computing systems and/or by other computing systems. In addition, in this example, each node manager 210 on a host computing system 208 may store information 212 about the current volumes attached to the host computing system and used by the executing programs 214 on the host computing system, such as to coordinate interactions with the BDS server systems 220 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 1 and 2 can be used to provide and manage resources shared among various customers. In one embodiment, a virtualized storage system can be provided using a number of data servers, each having a number of storage devices attached thereto. The storage system can expose the storage to the customers as a Web service, for example. Customers can then submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a hard drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Thus, in many ways, such a system functions as a traditional SAN, but with improved performance and scalability.

Using a management system as illustrated in FIG. 2, for example, a customer can make a Web service call into an appropriate API of a Web service layer of the system to provision a data volume and attach that volume to an executing program (e.g., virtual machine) for that customer. The management system can be thought of as residing in a control plane, or control environment, with the data volumes and block storage devices residing in a separate data plane, or data environment. In one example, a customer with at least one provisioned virtual machine can call a "CreateVolume" or similar API, via Web services, which enables the customer to specify the amount of storage to be allocated, such as a value between 1 GB and 1 TB, in 1 GB increments, and to specify the level of performance, such as a value between 100 to 2,000 IOPS, or 1 MB/s to 100 GB/s.

Components of the control plane, such as a BDS service manager, can call into the data plane to allocate the desired amount of storage at the requested level of performance from the available resources, and can provide the customer with an identifier for the data volume. In some embodiments, the customer then can call an "AttachVolume" or similar API, wherein the customer provides values for parameters such as a virtual machine identifier, a volume identifier, and a device name, depending on factors such as the operating system of the virtual machine, using a scheme that the operating system provides for hard drives and similar storage devices, as from inside the virtual machine there is no apparent difference, from at least a functionality and naming point of view, from a physical hard drive. Once the customer has attached the data volume to a provisioned virtual machine, the customer can perform various functionality, such as to build a file system, use as raw storage for a database system, use as a server boot, or any other such activity that would normally be performed with a conventional storage device. When the customer no longer requires the data volume, or for any other appropriate reason, the customer can call a "DetachVolume" or similar API, which can cause the association of the instance to that volume to be removed. In some embodiments, the customer can then attach a new virtual machine or perform any of a number of other such activities. Since the data volume will fail independently of the virtual machine in some embodiments, the customer can attach a volume to a new virtual machine if a currently associated virtual machine fails.

Systems and methods in accordance with various embodiments are operable to manage access to resources such as data storage. In at least some embodiments, these approaches include providing a BDS service that uses multiple server storage systems to reliably store block data that may be accessed and used over one or more networks by various users, applications, processes, and/or services. A user or customer of the BDS service may create one or more BDS volumes that each have a specified amount of block data storage space and a specified level of performance (e.g., IOPS, MB/s). The user may then initiate use of such BDS volumes (also referred to as "volumes" herein) by one or more executing programs, such as by mounting or attaching the volumes to the executing programs. In various embodiments, the volumes have copies (also referred to a "mirror volume copies" or "mirror copies" herein) stored in separate server storage systems so as to enhance volume reliability and availability to the executing programs. In some embodiments, the multiple BDS server systems that store block data may be organized into one or more pools or other groups that each have multiple physical server storage systems co-located at a geographical location (also referred to as "availability zone" herein), such as in each of one or more geographically distributed data centers.

In some embodiments, applications that access and use one or more of the BDS volumes may each have an associated node manager that manages the access to the BDS volumes, such as a node manager that is provided by the BDS service and/or that operates in conjunction with one or more BDS service managers. For example, a first user who is a customer of the BDS service may create a first BDS volume, and execute one or more program copies on one or more computing nodes that are instructed to access and use the first volume (e.g., in a serial manner, in a simultaneous or other overlapping manner, etc.). When an application executing on a computing node initiates use of a non-local volume, the application may mount, attach, or otherwise be provided with a logical block data storage device that is local to the computing node and that represents the non-local volume, such as to allow the executing program to interact with the local logical block data storage device in the same manner as any other HDD, SSD, or other physical block data storage device that is attached to the computing node (e.g., to perform read and write data access requests, to implement a file system or database or other higher-level data structure on the volume, etc.). For example, in some embodiments, a representative logical local block data storage device may be made available to an executing program via use of an appropriate technology, such as Global Network Block Device (GNBD) technology. In addition, when an application interacts with the representative local logical block data storage device, the associated node manager may manage those interactions by communicating with the one or more BDS server systems that stores a copy of the associated non-local volume (e.g., in a manner transparent to the executing program and/or computing node) so as to perform the interactions on that stored volume copy on behalf of the executing program. In some embodiments, the described techniques for managing access of applications and services to non-local BDS volumes are automatically performed by a node manager.

In various embodiments, BDS volumes (or portions of those volumes) may further be stored on one or more remote archival storage systems that are distinct from the BDS server systems used to store volume copies. In some embodiments, the remote archival storage systems may be provided by the BDS service (e.g., at a location remote from a data center or other geographical location that has a pool of co-located BDS server systems). In other embodiments, the remote archival storage systems may instead be provided by a remote long-term storage service, and can be used by the BDS service. In some embodiments, the archival storage system may store data in a format other than block data (e.g., may store one or more chunks or portions of a volume as distinct objects). In addition, use of the archival storage systems may be automatically performed under control of one or more archival managers, such as an archival manager provided by the BDS service or otherwise provided to operate in conjunction with the BDS service (e.g., provided by the remote long-term storage service to interact with the BDS service).

In some embodiments, the described techniques are performed on behalf of a program execution service that manages execution of multiple programs for multiple users of the program execution service. The program execution service may have groups of multiple co-located physical host computing systems, and may execute users' programs on those physical host computing systems, such as under control of a program execution service manager, as discussed in greater detail below. Users of the program execution service who are also users of the BDS service may execute programs that access and use non-local BDS volumes provided via the BDS service. In some embodiments, a single organization may provide both program execution service capabilities and BDS service capabilities (e.g., in an integrated manner, such as part of a single service). In other embodiments, the BDS service may be provided in environments that do not include a program execution service (e.g., internally to a business or other organization to support operations of the organization).

In various embodiments, the host computing systems on which programs execute may have various forms. Such host computing systems may be co-located in a physical location or availability zone (e.g., a data center), and may be managed by node managers that are each associated with a subset of one or more of the host computing systems. Some of the host computing systems may each include sufficient computing resources (e.g., volatile memory, CPU cycles or other CPU usage measure, network bandwidth, swap space, etc.) to execute multiple programs simultaneously. In some embodiments, the computing systems may each have one or more physically attached local block data storage devices (e.g., HDDs, SSDs, hybrid storage devices, etc.) that can be used to store local copies of programs to be executed and/or data used by such programs. Furthermore, the host computing systems may each host multiple virtual machines that execute one or more programs on behalf of a distinct user, with each host computing system having an executing hypervisor or other virtual machine monitor that manages the virtual machines for that host computing system. For host computing systems that execute multiple virtual machines, the associated node manager for the host computing system may execute on at least one hosted virtual machine (e.g., as part of or in conjunction with the virtual machine monitor for the host computing system). In other situations, a node manager may execute on a physical computing system distinct from the one or more other host computing systems being managed.

The BDS server systems on which volumes are stored may also have various forms. In some embodiments, the BDS server systems may be physical computing systems similar to the host computing systems that execute programs, and may each execute server storage system software to assist in the provision and maintenance of volumes on those server storage systems. For example, one or more server block data storage computing systems may execute at least part of the BDS service manager, such as if one or more BDS service managers are provided in a distributed peer-to-peer manner by multiple interacting server block data storage computing systems. In other embodiments, the BDS server systems may be network storage devices that lack some I/O components and/or other components of physical computing systems, such as if some of the provisioning and maintenance of volumes on those server storage systems is performed by other remote physical computing systems (e.g., by a BDS service manager executing on one or more other computing systems). In some embodiments, the BDS server systems each maintains multiple local hard drives, and stripes at least some volumes across a portion of each of some or all of the local drives. Various types of techniques for creating and using volumes may be used, including Logical Volume Manager (LVM) technology in some embodiments.

As previously noted, in some embodiments, the BDS volumes may each have a primary volume copy and at least one mirror volume copy stored on two or more distinct BDS server systems, such as to enhance reliability and availability of the volumes. By doing so, failure of a single BDS server system may not cause access of executing programs to a volume to be lost, as use of that volume by those executing programs may be switched to another available BDS server system that has a copy of that volume. In such embodiments, consistency may be maintained between the multiple copies of a volume on the multiple BDS server systems in various ways. For example, in some embodiments, the BDS server system that has the primary volume copy may receive and handle data access requests for the volume, and may further take action to maintain the consistency of the other mirror volume copies (e.g., by sending update messages to the other BDS server systems that provide the mirror volume copies when data in the primary volume copy is modified, such as in a master-slave computing relationship manner).

In various embodiments, BDS volumes may use a block-level replication mechanism, such as a kernel that implements a share-nothing, replicated storage solution to mirror the content of block devices between servers. A block-level replication mechanism works on top of block devices (i.e., hard disks or logical volumes), and uses a primary-slave replication architecture wherein the primary volume copy directs all the updates to the underlying block device. All input and output (I/O) requests to the block device are intercepted by the block-level replication mechanism kernel, with all write operations being automatically and synchronously replicated. A block-level replication mechanism can provide inherent failure detection of peer devices, and invokes appropriate recovery handlers when a peer node is unreachable. A block-level replication mechanism also can automatically resynchronize a temporarily unavailable node to the latest version of the data, in the background, without interfering with data access at the primary replica. A block-level replication mechanism may use generation identifiers to identify generations of replicated data, whereby the block-level replication mechanism can determine aspects such as whether the two nodes are members of the same replica pair, the direction of background re-synchronization (if necessary), and whether partial or full re-synchronization is needed. A block-level replication mechanism driver can start a new generation at any appropriate time, such as during the initialization of a replica pair, when a disconnected standby replica is switching to the primary volume copy, or when a resource in the primary role is disconnecting from the mirror volume copy. While a block-level replication mechanism is used herein as an example for purposes of explanation, it should be understood that any other appropriate block-level technology or mechanism can be used within the scope of various embodiments.

In some embodiments, a node manager for an executing program may interact solely with the primary volume copy via the primary BDS server system, such as if the primary volume copy is responsible for maintaining the mirror volume copies or if another replication mechanism is used. In such embodiments, if the primary BDS server system fails to respond to a request sent by the node manager (e.g., a data access request initiated by the executing program, a message or other request initiated by the node manager to periodically check that the primary BDS server system is available, etc.) within a predefined amount of time, or if the node manager is otherwise alerted that the primary volume copy is unavailable (e.g., by a message from the BDS service manager), the node manager may automatically switch its interactions to one of the mirror volume copies on a mirror BDS server system (e.g., with the executing program being unaware of the switch, other than possibly waiting for a slightly longer time to obtain a response to a data access request made by the executing program if it was that data access request that timed out and initiated the switch to the mirror volume copy). The mirror volume copy may be selected in various ways, such as if it is the only one, if an order in which to access multiple mirror volume copies was previously indicated, by interacting with the BDS service manager to request an indication of which mirror volume copy is promoted to act as the primary volume copy, etc. In other embodiments, volumes may have multiple primary copies, such as if a volume is available for simultaneous read access by multiple executing programs and the resulting data access load is spread across multiple primary copies of the volume. In such embodiments, a node manager may select one of the multiple primary volume copies with which to interact in various ways (e.g., in a random manner, based on an instruction from a BDS service manager, etc.).

In addition, the BDS service manager may take various actions in various embodiments to maintain reliable and available access of an executing program on a computing node to a BDS volume. In particular, if the BDS service manager becomes aware that a particular BDS server system (or a particular volume on a particular BDS server system) becomes unavailable, the BDS service manager may take various actions for some or all volumes stored by that BDS server system (or for the particular unavailable volume) to maintain its availability. For example, for each stored primary volume copy on the unavailable BDS server system, the BDS service manager may promote one of the existing mirror volume copies to be the new primary volume copy, and optionally notify one or more node managers of the change (e.g., the node managers for any executing programs that are currently using the volume). Furthermore, for each stored volume copy, the BDS service manager may initiate creation of at least one other new mirror copy of the volume on a different BDS server system, such as by replicating an existing copy of the volume on another available BDS server system that has an existing copy (e.g., by replicating the primary volume copy). In addition, other benefits may be achieved by using at least portions of a volume that are stored on remote archival storage systems to assist in replicating a new mirror copy of the volume (e.g., greater data reliability, an ability to minimize an amount of storage used for mirror volume copies and/or ongoing processing power used to maintain full mirror copies of volumes, etc.).

The BDS service manager may become aware of the unavailability of a BDS server system in various ways, such as based on a message from a node manager that cannot contact the BDS server system, based on a message from the BDS server system (e.g., to indicate that it has suffered an error condition, has begun a shutdown or failure mode operation, etc.), based on an inability to contact the BDS server system (e.g., based on periodic or constant monitoring of some or all of the BDS server systems), etc. Furthermore, unavailability of a BDS server system may be caused by various occurrences in various embodiments, such as failure of one or more hard disks or other storage mediums on which the BDS server system stores at least a portion of one or more volumes, failure of one or more other components of the BDS server system (e.g., the CPU, memory, a fan, etc.), an electrical power failure to the BDS server system (e.g., a power failure to a single BDS server system, to a rack of multiple BDS server systems, to an entire data center, etc.), a network or other communication failure that prevents the BDS server system from communicating with a node manager and/or the BDS service manager, etc. In some embodiments, failure of or problems with any component of a BDS server system may be considered to be an unavailability condition for the entire BDS server system. For example, in embodiments in which a BDS server system maintains multiple local hard disks, failure of or problems with any of the local hard disks may be considered to be an unavailability condition for the entire BDS server system. In other embodiments, a BDS server system will not be considered to be unavailable as long as it is able to respond to data access requests.

In some embodiments, the BDS service manager may decide to move one or more volumes from an existing BDS server system to a different BDS server system and/or decide to create a new copy of one or more volumes at various other times and for various other reasons. Such a movement of or creation of a new copy of a volume may be performed in a manner similar to that discussed in greater detail elsewhere (e.g., by replicating the primary copy of the volume to create a new copy, and by optionally removing the prior copy of the volume in at least some situations, such as when the volume copy is being moved). Situations that may prompt a volume move or new volume copy creation include, for example, the following nonexclusive list: a particular BDS server system may become overutilized (e.g., based on usage of CPU, network bandwidth, I/O access, etc.), such as to trigger movement of one or more volumes from that BDS server system; a particular BDS server system may need maintenance or upgrades that will cause it to be unavailable for a period of time, such as to trigger temporary or permanent movement of one or more volumes from that BDS server system; based on recognition that usage patterns for a particular volume or other characteristics of a volume may be better accommodated on other BDS server systems, such as another BDS server system with additional capabilities (e.g., for volumes that have frequent data modifications, to use a primary BDS server system with higher-than-average disk write capabilities); in response to a request from a user who created or is otherwise associated with a volume (e.g., in response to the user purchasing premium access to a BDS server system having enhanced capabilities); to provide at least one new copy of a volume in a different geographical location (e.g., another data center) at which programs execute, such as to trigger movement of and/or copying of the volume from a BDS server system at a first geographical location when use of a volume by an executing program at another geographical location is requested; etc.

In addition, after a volume has been moved or a new copy created, the BDS service manager may update one or more node managers as appropriate (e.g., only node managers for executing programs currently using the volume, all node managers, etc.). In some embodiments, various information about volumes may be maintained, such as by having one or more copies of a volume information database that is network-accessible to node managers and/or the BDS service manager. A non-exclusive list of types of information about volumes that may be maintained includes the following: an identifier for a volume, such as an identifier that is unique for the BDS server systems that store copies of the volume or that is globally unique for the BDS service; restricted access information for a volume, such as passwords or encryption keys, or lists or other indications of authorized users for the volume; information about the primary BDS server system for the volume, such as a network address and/or other access information; information about one or more mirror BDS server systems for the volume, such as information about an ordering that indicates which mirror BDS server system will be promoted to be the primary system if the existing primary server storage system becomes unavailable, a network address and/or other access information, etc.; information about any snapshot volume copies that have been created for the volume, as described in greater detail below; information about whether the volume is to be available to users other than the creator of the volume, and if so under what circumstances (e.g., for read access only, for other users to make their own volumes that are copies of this volume, pricing information for other users to receive various types of access to the volume); etc.

In addition to maintaining reliable and available access of executing programs to BDS volumes by moving or otherwise replicating volume copies when BDS server systems become unavailable, the BDS service may perform other actions to maintain access of executing programs to BDS volumes. For example, in some embodiments, if a first executing program unexpectedly becomes unavailable, the BDS service and/or program execution service may take actions to have a different second executing program (e.g., a second copy of the same program that is executing on a different host computing system) attach to some or all BDS volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location or availability zone as the first program. In other embodiments, the second program may be at a different geographical location or availability zone (e.g., such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

In various embodiments, other techniques may be used to provide reliable and available access to BDS volumes, such as to allow a copy of an indicated volume to be saved to one or more remote archival storage systems (e.g., at a second geographical location that is remote from a first geographical location at which the BDS server systems store the active primary and mirror copies of the volume and/or that is remote from the host physical computing systems that execute the programs that use the volume), such as for long-term backups and/or other purposes. For example, in some embodiments, the archival storage systems may be provided by a remote network-accessible storage service. In addition, the copies of a volume that are saved to the archival storage systems may in at least some situations be snapshot copies of the volume at a particular point in time, but which are not automatically updated as ongoing use of the volume causes its stored block data contents to change, and/or which are not available to be attached to and used by executing programs in the same manner as volumes. Thus, as one example, a long-term snapshot copy of a volume may be used, for example, as a backup copy of a volume, and, in some embodiments, may further serve as the basis of one or more new volumes that are created from the snapshot copy (e.g., such that the new volumes begin with the same block data storage contents as the snapshot copy).

As previously noted, in some embodiments, some or all BDS volumes each have copies stored on two or more distinct BDS server systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, the described techniques may provide access to non-local block data storage that has access characteristics that are similar to or better than access characteristics of local physical block data storage devices, but with much greater reliability that is similar to or exceeds reliability characteristics of RAID systems and/or dedicated Storage Area Networks (SANs) and at much lower cost. In other embodiments, the primary and mirror copies for at least some volumes may instead be stored in other manners, such as at different geographical locations (e.g., different data centers or availability zones), such as to further maintain availability of a volume even if an entire data center or availability zone becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

In some embodiments, access to the described techniques may be provided in a fee-based or other paid manner to at least some users. For example, users may pay one-time fees, periodic (e.g., monthly) fees and/or one or more types of usage-based fees to use the BDS service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of BDS server systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms, such as a onetime purchase fee, an ongoing rental fee, and/or based on another ongoing subscription basis. Furthermore, in some embodiments, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In various embodiments, one or more application programming interfaces (APIs) may be provided by the BDS service, program execution service and/or remote long-term storage service, such as to allow other programs to programmatically initiate various types of operations to be performed (e.g., as directed by users of the other programs). Such operations may allow the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, executing programs on host computing systems of the program execution service and/or by computing systems of customers or other users that are external to the one or more geographical locations used by the BDS service and/or program execution service.

In some embodiments, the management system may be configured to enable users to request a level of performance for their provisioned volumes. For example, the "CreateVolume" or a similar API may allow users to instantiate BDS volumes having committed request rates or other performance guarantees, such as a minimum number of IOPS for the volumes. Components of the management system, such as BDS service manager, can allocate the desired amount of server resources and other resources necessary to provide at least a committed level of performance. By specifying a desired level of performance, a user can receive a consistent quality of service level that is not affected by the performance of other users sharing a device or resource. Even in an overload situation, the user can receive at least the guaranteed level of service. The amount of guaranteed service can depend upon various factors, as well as the amount specified and paid for by the customer. One such approach for provisioning a data volume according to a user-specified level of performance can be found, for example, in co-pending U.S. patent application Ser. No. 12/749,451, filed Mar. 29, 2010, entitled "Managing Committed Request Rates for Shared Resources," which is hereby incorporated herein by reference for all purposes.

Systems and methods in accordance with various embodiments also enable a user to modify operational parameters for one or more provisioned data volumes. For instance, a "ModifyVolume" or a similar API can be provided to a user to dynamically adjust operational parameters associated with the user's provisioned volume(s). In some embodiments, the user can increase or decrease the user's allocated data storage without affecting a guaranteed quality of service associated with the allocated data storage. In other embodiments, the user can simultaneously resize one or more data volumes and scale the associated level of service upward or downward to dynamically meet application demand. In still other embodiments, the user can alter other operating parameters of provisioned volumes, such as the hardware type (e.g., HDD or SSD) or the geographical location, with minimal disruption to one or more executing programs that access the volumes. FIGS. 3($a$)-($e$) illustrate an example of providing the capability of dynamically resizing non-local block data storage in accordance with various embodiments, such as on behalf of a BDS service. In particular, FIG. 3($a$) depicts several BDS server systems 310, 312, and 314. Each of the BDS server systems store one or more volume copies, each volume having a primary copy and at least one mirror copy. In other embodiments, other arrangements may be used, as discussed in greater detail elsewhere, such as by having multiple primary volume copies (e.g., with all of the primary volume copies being available for simultaneous read access by one or more programs) and/or by having multiple mirror volume copies. The BDS server systems 310, 312, and 314 may each correspond to a subset of the BDS server systems 122 of FIG. 1. In this example, the server storage system 310 can be seen storing at least three volume copies, including the primary copy 320 for volume A, a mirror copy 322 for volume $B_O$, and a mirror copy 324 for volume C. Each of these volume copies can be characterized as currently "active" because they are capable of performing user I/O requests. For example, primary volume copy 320 may be attached to an executing program that accesses the primary volume copy 320 for reading and/or writing data; mirror volume copy 322 may be mirroring user write requests made to corresponding primary volume copy 326; and mirror volume copy 324 may be replicating write requests made to a primary volume copy for Volume C (not shown). Volume copies 320, 322, and 324 may also be characterized as currently "active" because none of these volume copies are being blocked from user read/write access or are otherwise disconnected from users of the BDS service. One or more other volume copies that are not illustrated in this example may further be stored by the server storage system 310, as well as by other server storage systems, such as BDS server systems 312 and 314. Another BDS server system 312 stores the primary copy 326 for volume $B_O$, as well as a mirror copy 328 volume D. In addition, server storage system 314 includes a mirror copy 330 for volume A and a primary copy 332 for volume D. The volume copies 320, 322, 324, 326, 328, 330, and 332 may correspond to a subset of volume copies 120 of FIG. 1.

Figure 3A:
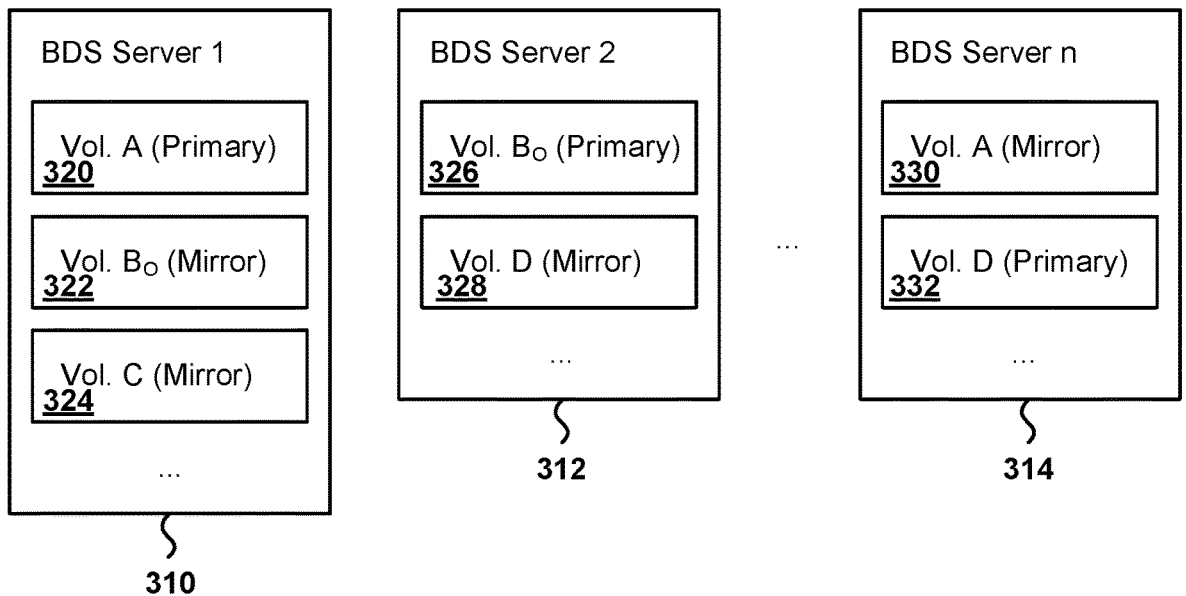
FIGS. 3(a)-(e) illustrate examples of dynamically modifying operational parameters of data storage volumes in accordance with various embodiments.

As previously noted, an executing program (not shown) is attached to and using volume A, and the node manager for that executing program is interacting with BDS server system 310 to access the primary copy 320 for volume A, such as via server storage system software (not shown) that executes on the BDS server system 310. Similarly, for one or more executing programs (not shown) attached to and using volumes $B_O$ and D, the node manager(s) for the executing program(s) will interact with BDS server systems 312 and 314, respectively, to access the primary copies 326 for volume $B_O$ and 332 for volume D, respectively. In addition, other BDS server systems may further be present, and may store the primary volume copy for volume C and/or other primary and mirror volume copies, but are not shown in this example. Thus, each BDS server system may store more than one volume copy, and each BDS server system may store a combination of primary and mirror volume copies, although in other embodiments volumes may be stored in other manners. In this example, volumes A, $B_O$, C, and D are each associated with different customers. In other embodiments, volumes A, $B_O$, C, and D may be associated with a single customer, or a subset of the volumes (e.g., volumes A and $B_O$) may be associated with a first customer and the remaining volumes (e.g., volumes C and D) may be associated with one or more other customers. Thus, each BDS server system may store volumes for different customers, although a BDS server system may be dedicated to a single user or entity in other embodiments. In FIG. 3(a), each of the volume copies 320, 322, 324, 326, 328, 330, and 332 are currently active, i.e., are capable of receiving and responding to user I/O requests.

Figure 3B:
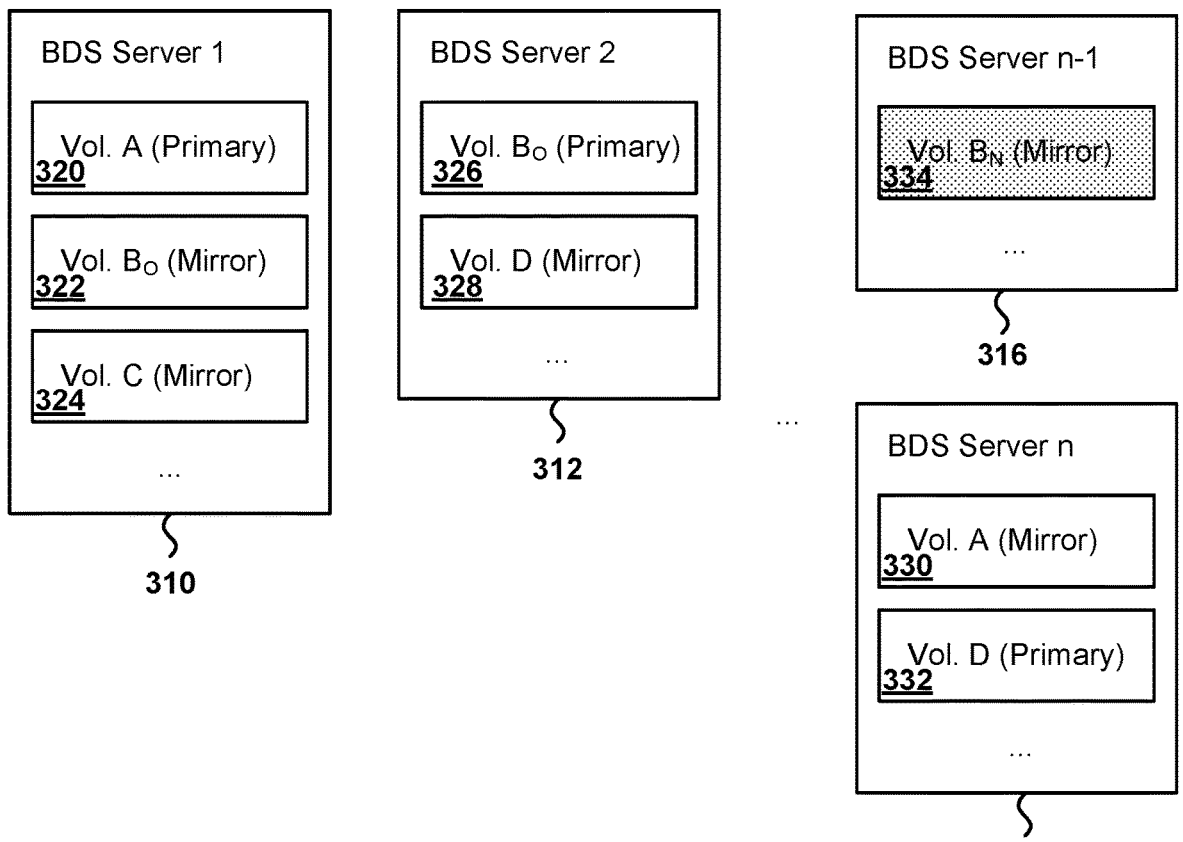

FIG. 3(b) illustrates BDS server systems similar to those of FIG. 3(a), but at a later point in time after a customer associated with Volume $B_O$ (referred to as "customer B" herein) requests to resize Volume $B_O$ from 100 GB to 500 GB with the same minimum level of performance, such as at least 100 IOPS (or, e.g., 20 MB/s). In this example, the BDS server system 312 is configured with total storage capacity of approximately 1 TB and can perform approximately 1000 IOPS (or, e.g., 100 MB/s) on average in total. However, current utilization for BDS server system 312 is such that approximately 900 GB have been allocated to other users sharing BDS server system 312. In addition, processing and network resources associated with BDS server system 312 have been committed such that system 312 can guarantee no more than 100 IOPS (or, e.g., 20 MB/s) for a new volume of approximately 100 GB. Thus, in this example, BDS server system 312 lacks the resources to fulfill customer B's request to resize volume $B_O$ to the specified size and to maintain the desired performance level. In response to determining that server storage system 312 lacks the resources for customer B's request, a BDS service manager (not shown) may attempt to locate a BDS server system with sufficient data storage capacity, processing resources, and/or networking resources for provisioning a new resized volume $B_N$. Here, BDS server system 316 has been located and determined to have the requisite resources to fulfill customer B's request, and storage capacity, processing resources, and networking resources of system 316 are allocated for new volume $B_N$. Volume data of $B_O$ is then migrated to the newly allocated volume $B_N$ on BDS server system 316.

In this example, the BDS server system 310 with mirror volume copy 322 is used to migrate the data to the newly allocated volume copy 334 for customer B, and primary volume copy 326 remains available for direct user read/write access. One advantage of such an approach is to minimize the impact caused by the data migration process. Data migration can increase latency for a user of a shared resource and processes interacting with the shared resource, but those effects can be reduced by reading from a mirror volume copy instead of an active primary volume copy. However, it will be appreciated by one of ordinary skill in the art that data can also be migrated from the primary volume copy in other embodiments, such as when a BDS service blocks all I/O to a volume during data migration. During the data migration process, the resized volume copy 334 is initially designated as a mirror volume copy. Users can continue reading from and writing to the primary copy 326 of volume $B_O$, writes continue to be replicated to mirror volume copy 322, and the writes to mirror volume copy 322 are replicated to resized volume copy 334 during migration. Mirror volume copy 334, however, cannot be accessed directly by users during the data migration process, and direct user reads and writes cannot be made to mirror volume copy 334 until the data migration process is complete and the BDS service maps user connections to volume copy 334. Thus, volume copy 334 is "blocked" from direct user access during the data migration process, as indicated by the gray shading.

Figure 3C:
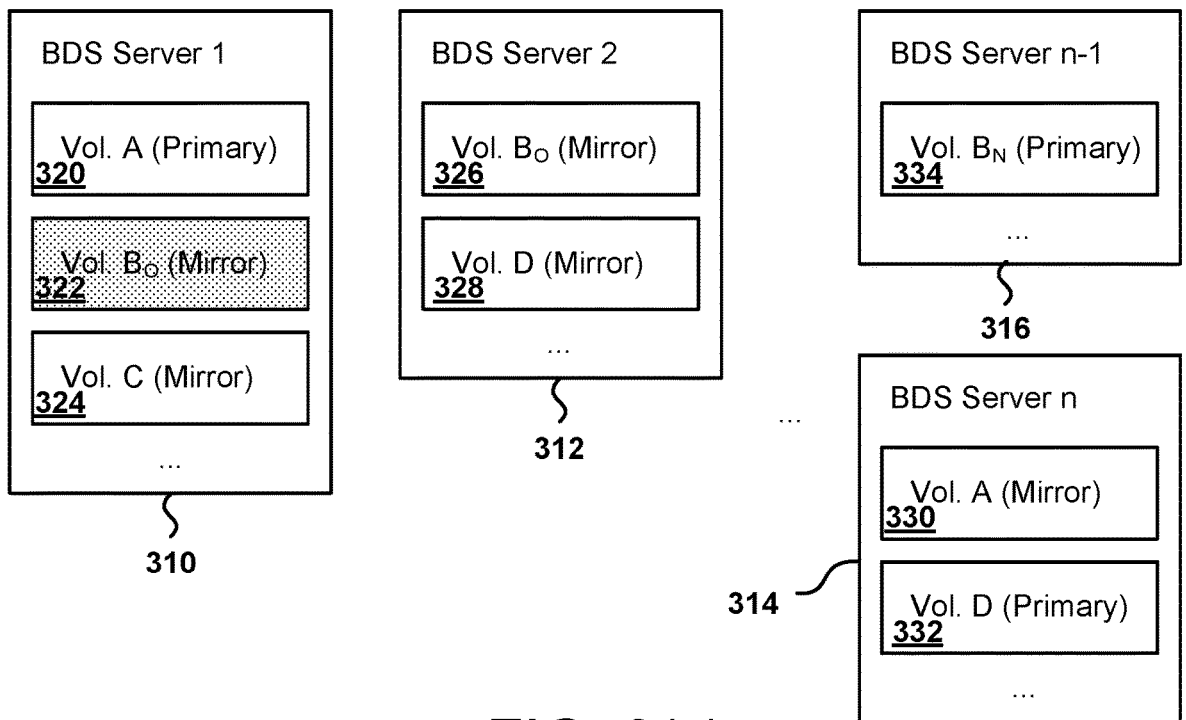

FIG. 3(c) illustrates BDS server system after the data of mirror volume copy 322 of volume $B_O$ has been migrated to the resized volume copy 334. At this point in time, the volume copy 334 is designated the new primary volume copy for customer B, and the original primary volume copy 326 is concurrently designated as the new mirror volume copy for customer B, such as by mapping links, pointers, references, addresses, etc. corresponding with original primary volume copy 326 to new resized volume copy 334 and original mirror volume copy 322 to original primary volume copy 326, respectively. If one or more executing programs were previously attached to or otherwise interacting with the original primary volume copy 326, those programs may be automatically transitioned to continue ongoing interactions with BDS server system 316 to access the new primary volume copy 334. Thus, volume copy 334 becomes the active primary volume copy, volume copy 326 becomes the active mirror volume copy, and volume copy 322 becomes inactive. That is, mirror volume copy 322 may be blocked from replicating write requests, as indicated by the gray shading. In addition, the storage capacity of original mirror copy 322 may be deallocated and the associated resources for original mirror copy 322 can be freed for other users. The primary copy 320 of volume A and the primary copy 332 of volume D continue to be available on server storage systems 310 and 314, respectively, and any programs that were previously attached to or otherwise interacting with the primary copy 320 of volume A and 332 of volume D will continue to interact with server storage systems 310 and 314, respectively, without modification. Likewise, the mirror copy 330 of volume A and the mirror copy 328 of volume D continue to be available on server storage systems 314 and 312, respectively, without modification.

Although the example of FIG. 3(c) shows the BDS service activating the original primary volume copy 326 to be the new mirror volume copy when the new primary volume copy 334 is determined to be operational (e.g., storage capacity and other resources are successfully allocated, and the data from the original mirror volume copy has been migrated to the new volume copy), it will be appreciated by those of ordinary skill in the art that other embodiments use different approaches. For example, in other embodiments, the original mirror volume copy 322 can continue to the active mirror volume copy, and the original primary volume copy 326 can be rendered inactive, i.e., blocked from receiving user I/O requests. In such embodiments, the storage capacity and resources associated with volume copy 326 can be deallocated and freed for other users when volume copy 334 becomes the active primary volume copy for customer B. One advantage to such an approach is to reduce the latency associated with remapping the original primary volume copy to be the active mirror volume copy. In still other embodiments, all user access to customer B's volume can be blocked during resizing such that either the primary copy or the mirror copy can be used to migrate volume data to the newly resized volume.

Figure 3D:
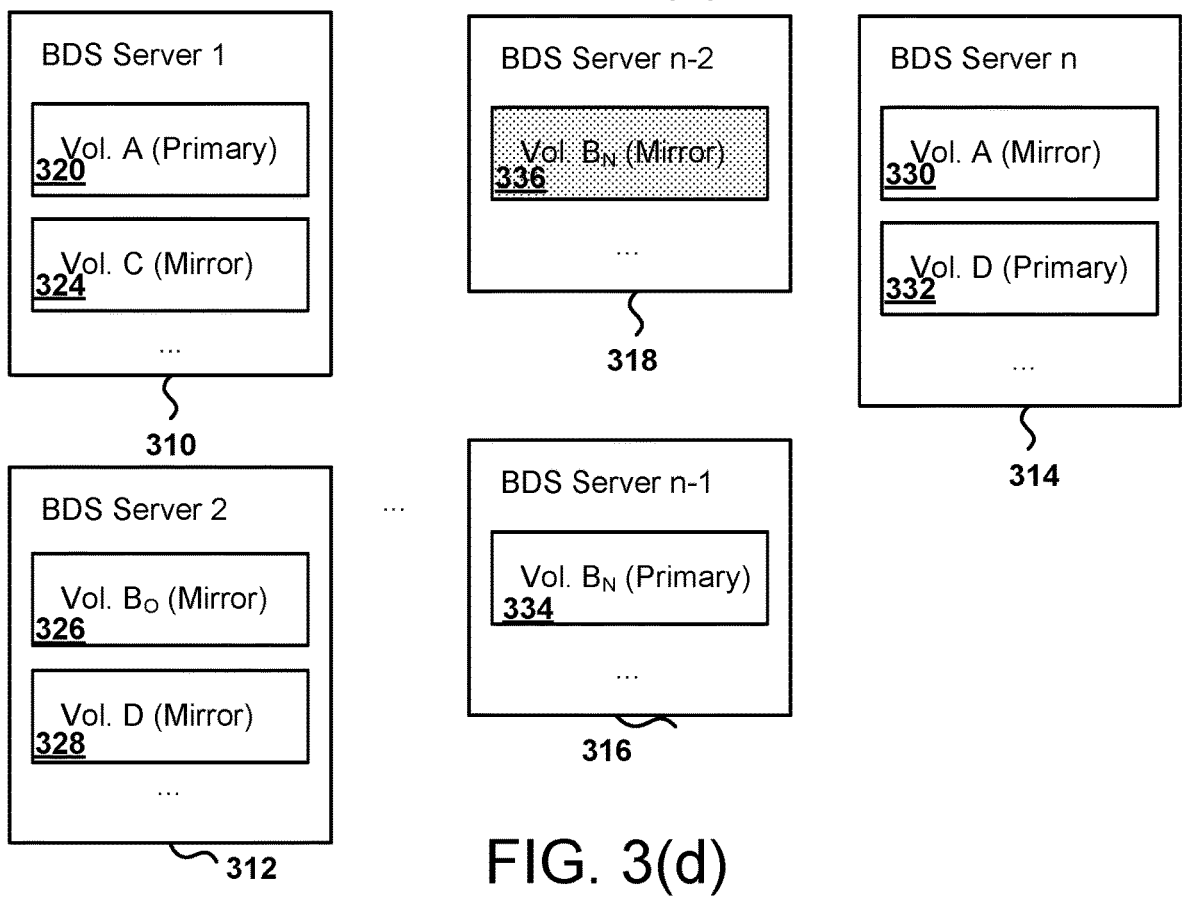

FIG. 3(d) illustrates BDS server systems at a later point in time after the BDS server systems have been modified in response to customer B's request to resize her volume as shown in FIG. 3(c). At this particular moment, a BDS service manager (not shown) attempts to locate a BDS server system with sufficient data storage capacity for providing a new mirror volume copy in accordance with customer B's request for a resized vlume. In this example, it has already been determined that BDS server system 312 lacks adequate storage capacity for the new mirror volume copy for customer B. Hence, the BDS service manager locates another BDS server system 318 having sufficient storage capacity for the new mirror volume copy, and allocates the storage capacity on system 318 for the mirror volume copy 336 for volume $B_N$. Volume copy 326, which is the new active mirror volume copy for customer B, is used to migrate data for customer B's volume to the newly allocated volume copy 336 on BDS server system 318. While the data migration process is occurring, volume copy 336 is blocked from direct user read/write access, as indicated by the gray shading. FIG. 3(d) also illustrates that BDS server system 310 no longer includes volume copy 322, which has been deallocated for use by other users of the BDS service.

Figure 3E:
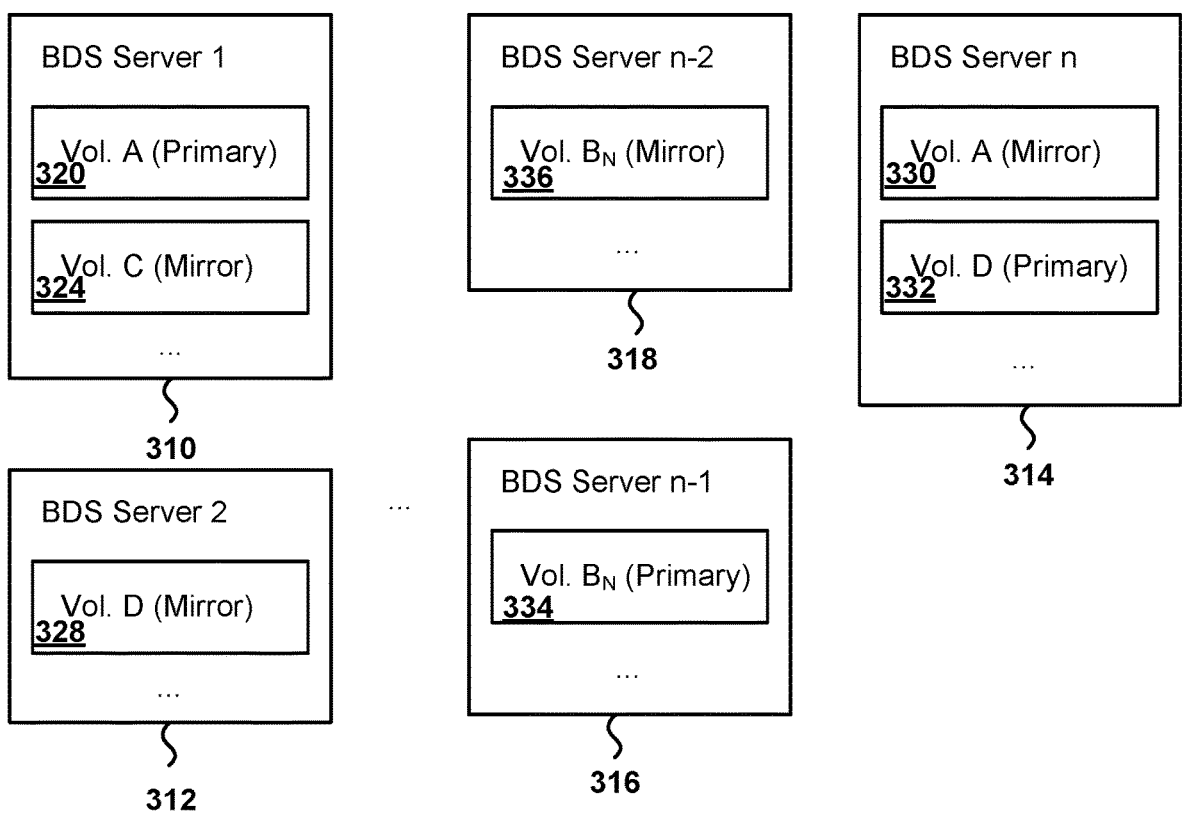

FIG. 3(e) illustrates BDS server systems at a later point in time after the data of volume copy 326 on BDS server system 312 has been migrated to the volume copy 336 on BDS server system 318. Volume copy 318 is now designated as the active mirror volume copy for customer B, and replicates write requests made to active primary volume copy 334 on BDS server system 316. In this example, volume copy 326, which was previously allocated on BDS server system 312, has been deallocated for use by other users of the BDS service. Thus, in the manner illustrated by FIGS. 3(a)-(e), a BDS service can be implemented to enable a user to modify operational parameters of provisioned data volumes with little to no disruption of access to the provisioned data volumes. Such an approach avoids the additional complexity, latency, data overhead, and monetary costs associated with adding additional volumes and segmenting data across several volumes. Such an approach also bypasses at least one additional data migration (e.g., migrating data of a current volume to a separate data system, and then creating a new volume from the volume in the separate data system), and the effort with self-administering migration to a larger volume and/or volume operating with a modified guaranteed level of service. In addition, latency associated with migrating data to a separate data system or to data systems of a storage type having higher latency can also be avoided in at least some embodiments.

Figure 4A:
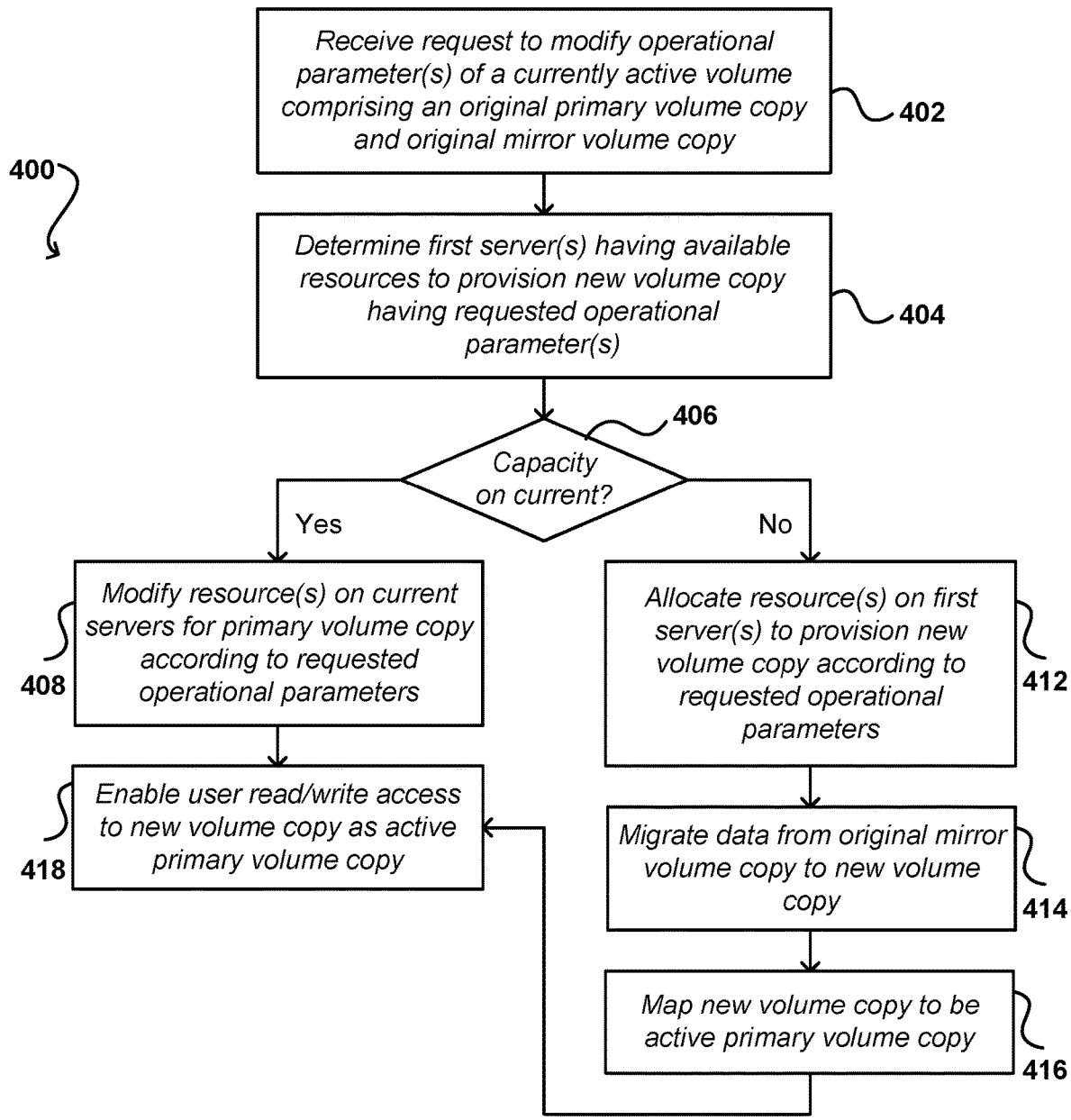
FIG. 4(a)-(b) illustrate example processes for dynamically modifying operational parameters of data storage volumes in accordance with various embodiments.

Using components such as those discussed above with respect to FIGS. 1 and 2, FIG. 4 illustrates an example process 400 by which operational parameters for a provisioned data volume can be modified for a given customer in accordance with various embodiments. As should be understood, the illustrated steps are examples, and that additional, fewer, or alternative steps can be performed in similar or alternative orders, or in parallel, within the scope of the various embodiments. Further, the process can be performed for any appropriate components or elements, such as at least one data instance, repository, or other such data source in a data environment, here a data plane, using a control plane or a similar data control application or service.

In embodiments where a modification of an operational parameter of an active data volume, such as a change to the size or a level of performance of the data volume, is triggered by a user request, a Web services call or similar request is received through one of a plurality of APIs or other such customer-facing interface components 402. The volume is characterized as active because it is capable of receiving and appropriately responding to user read/write requests. The active data volume comprises a primary volume copy and at least one mirror volume copy. The request can be analyzed to determine any action(s) needed to process the request, where necessary. As discussed, this can take the form of a component of a Web services layer parsing the request to determine the action(s) being requested. In an embodiment where the API receiving the request corresponds to a specific action to be performed, the Web services layer can extract information from the request to be used in determining aspects of the action(s) to be performed.

The system can then determine one or more first servers having the resources available to provision a data volume capable of operating according to the requested operational parameters 404. As discussed elsewhere, in some embodiments this includes searching against a table in a data store accessible to the management system, or other such repository, to determine whether a server has the desired storage capacity, storage type, processing resources, networking resources, etc. In other embodiments, this can involve contacting each of the servers individually. Even though a new data volume can be provisioned by combining storage capacity and other resources of multiple servers, it can be desirable from at least a management standpoint to attempt to provision a data volume using a server that the customer is already using, instead of spreading a provisioned volume across one or more servers. If the current server(s) being used by that customer has sufficient resources available to satisfy the request 406, the process can cause the current server(s) to modify and/or allocate the resources to provision the data volume according to the requested operational parameter(s) 408.

If the current server(s) do not have capacity to provision the data volume for the customer according to the request, the process can attempt to locate at least one server with resources available to satisfy the request. In some embodiments, if a single server has adequate resources for a data volume capable of operating according to the requested parameter(s), the data volume can be provisioned from that single server instead of being spread across multiple servers. In other embodiments, multiple servers can be combined or striped to provide the specified data storage capacity and/or level of performance for the customer. In some embodiments, the system can attempt to consolidate the data volume for a customer to as few servers as possible, to minimize or at least reduce the number of servers allocated to a single customer. Various other approaches can be used as well within the scope of the various embodiments.

When at least one server is located that is able to provide the data volume according to the requested operational parameter(s), the process can cause the server(s) to allocate resources necessary to provision a data volume in accordance with the parameter(s) 412. Data from the currently active volume can be migrated to the new data volume 414. As previously noted, in some embodiments, data from a mirror volume copy can be migrated to the new volume copy and the original primary volume copy can remain available for read/write access. In other embodiments, the system may prohibit access to the original primary volume copy and original mirror volume copy during the migration process, and data can be migrated from either the original primary volume copy or the original mirror volume copy to the new volume copy. During data migration, the new volume copy is blocked from direct user read/write access while the original primary volume copy and original mirror volume copy continue to enable user read/write access. After the data from the mirror volume copy has been migrated to the new volume, mapping information can be generated in order to direct access to the provisioned volume to the new volume copy 416, i.e., the new volume copy is mapped to be the new primary volume copy for the user. Resources of the current server(s) allocated to provision the original primary volume copy can be deallocated and made available to other users. In one embodiment, the original primary volume copy is remapped to be the new mirror volume copy, and the original mirror volume copy is blocked from user read/write requests, and subsequently deallocated. In another embodiment, the original mirror volume copy continues as a mirror volume for the new primary volume copy and the original primary volume copy is blocked from user read/write requests, and subsequently deallocated for other users.

Figure 4B:
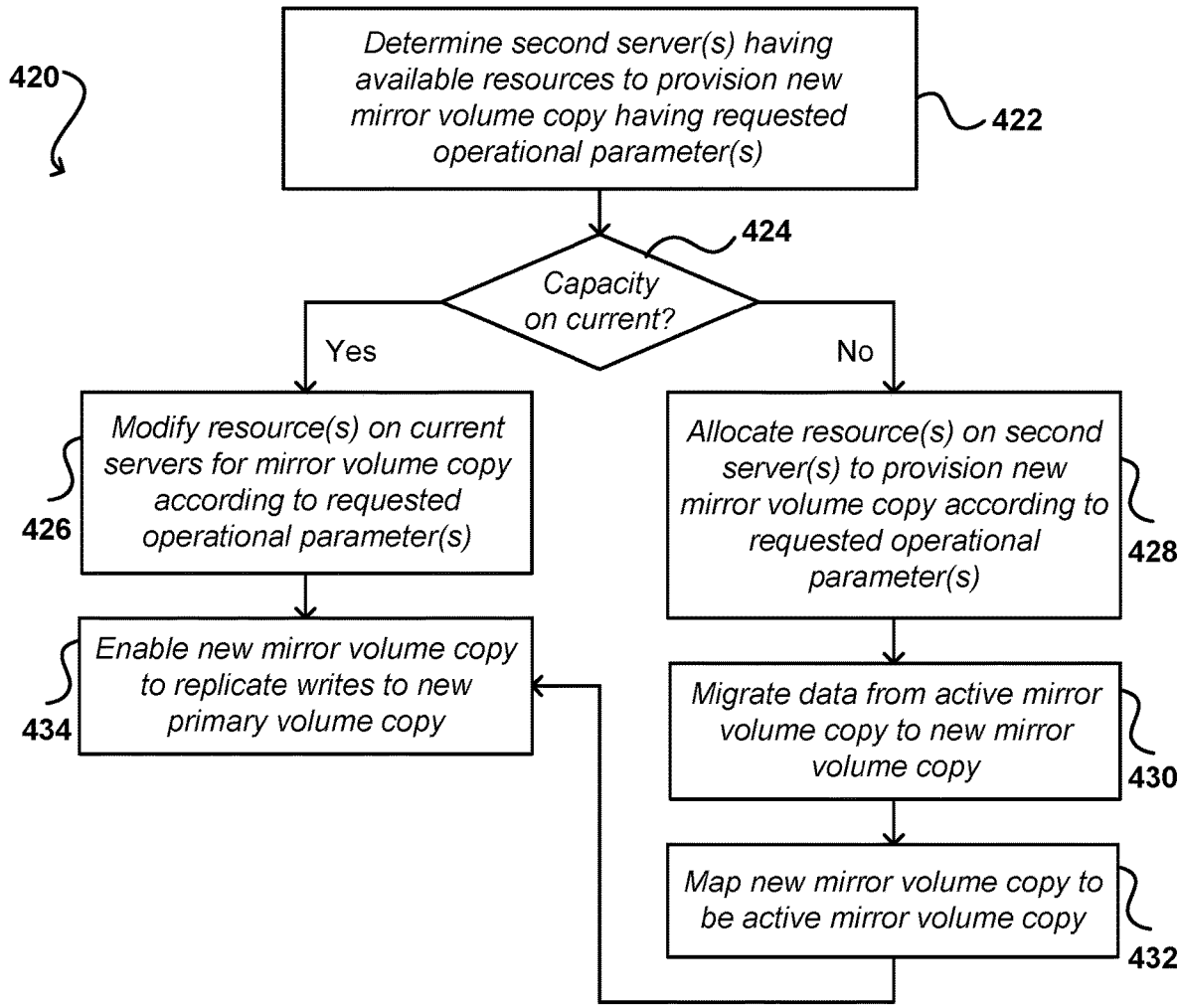

FIG. 4(b) illustrate an example process 420 including additional steps that can be taken to dynamically modify operational parameters in accordance with various embodiments. In this example, a BDS service attempts to determine a second set of one or more servers having at least available storage capacity for a new mirror volume copy 422. As previously mentioned, it may be preferable to provide for the new mirror volume copy on the current server(s) providing the current mirror volume copy if the current server(s) have at least the requisite data storage capacity. Accordingly, the system can determine whether the current server(s) indeed have available storage capacity for the new mirror volume copy 424, and can then cause the current server(s) to allocate the storage capacity for the new mirror volume copy 426. In some embodiments, results from the previous determination of servers capable of provisioning a primary volume copy of a new data volume 404 can be reused for the determination of servers capable of provisioning a mirror volume copy of the new data volume 420. If the current server(s) lack at least the data storage capacity to provide for the new mirror volume copy, other server(s) can be located and selected for allocating the data storage capacity 428, and data from the current mirror volume copy can be migrated to the new mirror volume copy 430. The new mirror volume copy can then be mapped to be the active mirror volume copy 432, and resources of the current server(s) can be freed for use by other customers. At this point in time, the new mirror volume copy can begin replicating write requests to the new primary volume copy 434.

In various embodiments, modifications to a provisioned volume can be made due at least in part to detected changes in any of a number of different aspects of the resources in the data plane, as well as the usage of those resources. For example, the user may configure a provisioned volume to operate within minimum and/or maximum threshold rates. In one embodiment, the user may specify a maximum threshold rate at which the data storage capacity for a provisioned volume can reach, such as 80% to 90% of capacity, before the provisioned volume is resized to a larger size. In another embodiment, the user can monitor a provisioned data volume for a specified period of time and if data storage capacity never exceeds a minimum threshold rate, such as 40% or 50% of capacity, during that period, the system automatically resizes the volume to a smaller size. In some embodiments, the user can provision a data volume in a geographical location during off-peak hours for a time zone associated with that geographical location, and can configure the data volume to be re-provisioned in a second geographical location during off-peak hours for a second time zone associated with the second geographical location.

In some embodiments, the system might automatically adjust operational parameters of provisioned volumes for various users, such as in some of the situations discussed above (e.g., data storage capacity reaching a maximum threshold rate, data storage capacity below a minimum threshold rate for a specified period of time, or provisioning in various geographical locations based on off-peak hours). In other embodiments, the system can automatically adjust operational parameters of provisioned volumes to different geographic locations upon detection of a systemic failure at a particular geographic location. Various other approaches can be used as well within the scope of the various embodiments.

Figure 5:
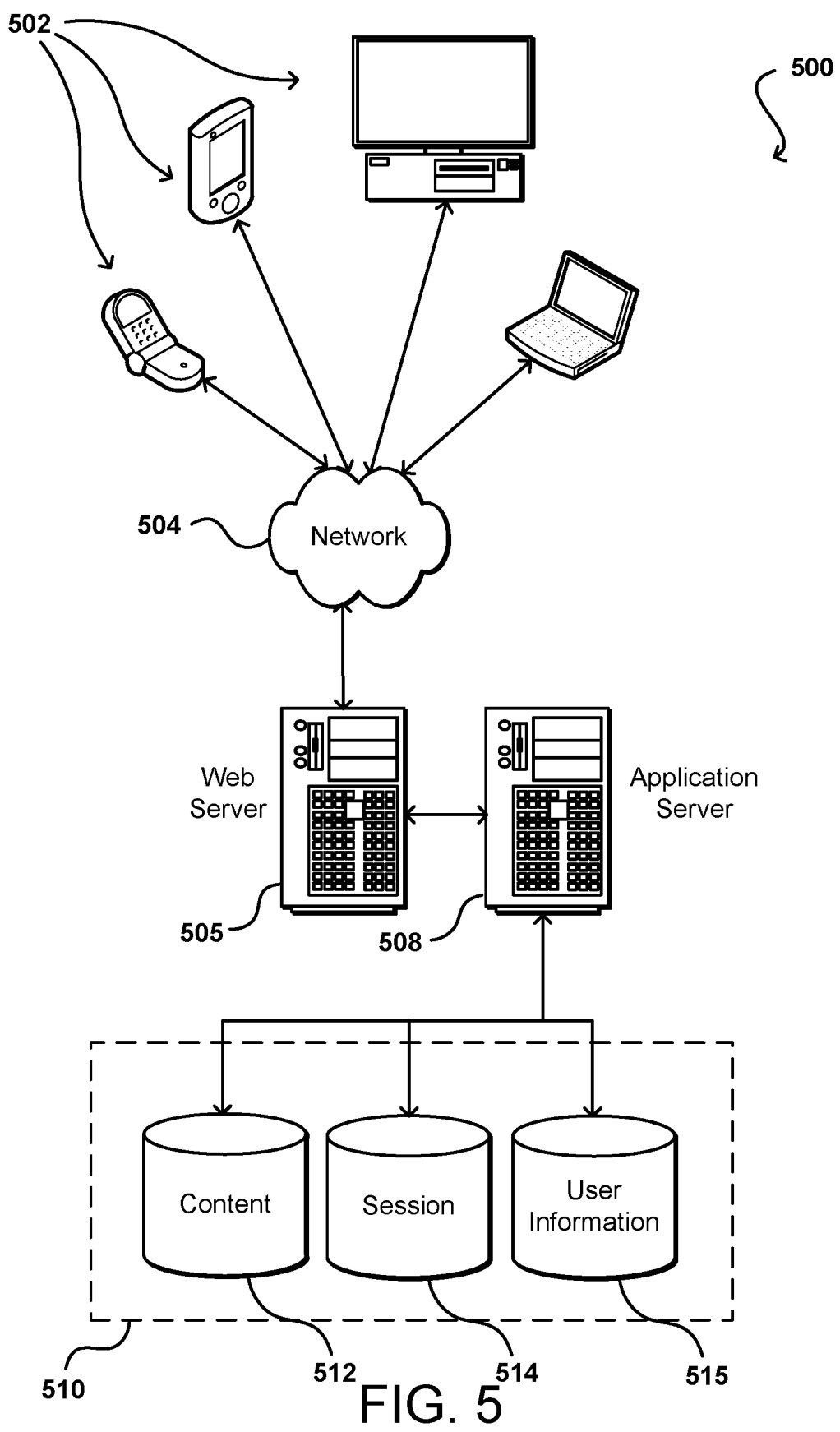
FIG. 5 illustrates an example environment that can take advantage of functionality of the various embodiments.

As discussed, different approaches can be implemented in various environments in accordance with the described embodiments. For example, FIG. 5 illustrates an example of an environment 500 for implementing aspects in accordance with various embodiments. As will be appreciated, although a Web-based environment is used for purposes of explanation, different environments may be used, as appropriate, to implement various embodiments. The system includes an electronic client device 502, which can include any appropriate device operable to send and receive requests, messages, or information over an appropriate network 504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 506 for receiving requests and serving content in response thereto, although for other networks, an alternative device serving a similar purpose could be used, as would be apparent to one of ordinary skill in the art.

The illustrative environment includes at least one application server 508 and a data store 510. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server 508 can include any appropriate hardware and software for integrating with the data store 510 as needed to execute aspects of one or more applications for the client device and handling a majority of the data access and business logic for an application. The application server provides access control services in cooperation with the data store and is able to generate content such as text, graphics, audio, and/or video to be transferred to the user, which may be served to the user by the Web server 506 in the form of HTML, XML, or another appropriate structured language in this example. The handling of all requests and responses, as well as the delivery of content between the client device 502 and the application server 508, can be handled by the Web server 506. It should be understood that the Web and application servers are not required and are merely example components, as structured code discussed herein can be executed on any appropriate device or host machine as discussed elsewhere herein.

The data store 510 can include several separate data tables, databases, or other data storage mechanisms and media for storing data relating to a particular aspect. For example, the data store illustrated includes mechanisms for storing content (e.g., production data) 512 and user information 516, which can be used to serve content for the production side. The data store is also shown to include a mechanism for storing log or session data 514. It should be understood that there can be many other aspects that may need to be stored in the data store, such as page image information and access rights information, which can be stored in any of the above listed mechanisms as appropriate or in additional mechanisms in the data store 510. The data store 510 is operable, through logic associated therewith, to receive instructions from the application server 508 and obtain, update, or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers, and business application servers. The server(s) may also be capable of executing programs or scripts in response requests from user devices, such as by executing one or more Web applications that may be implemented as one or more scripts or programs written in any programming language, such as Java®, C, C#, or C++ or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices, as well as storage media for temporarily and/or more permanently containing, storing, transmitting, and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing shared resources, comprising:
   under control of one or more computer systems configured with executable instructions,
      receiving a request to resize a current volume comprising data on at least one first server to a capacity;
      creating, in response to the request and on at least one second server, a new volume having the capacity and operable at a specified rate of input/output (I/O) operations per second (IOPS);
      migrating the data of the current volume to the new volume;
      receiving, in the current volume, an I/O user request for the data;
      responding to the I/O user request from the current volume using at least one portion of the data from the current volume with the new volume being unavailable for user access during the migration, the at least one portion of the data previously migrated out of the current volume and remaining available in the current volume for responding to the I/O user request; and
      activating the new volume for receiving and responding to post-migration I/O requests associated with the data migrated out of the current volume.

2. The computer-implemented method of claim 1, wherein the request comprises a change in one or more operational parameters of the at least one first server hosting the current volume, and wherein the change causes the one or more computer systems to initiate the request to resize the current volume.

3. The computer-implemented method of claim 2, wherein the one or more operational parameters comprise one or more of: a volume data size, a data storage type, a committed rate of IOPS, throughput, bandwidth, or a geographical location.

4. The computer-implemented method of claim 1, further comprising:

determining the at least one second server having at least the resized capacity for a secondary volume;
allocating at least a portion of the resized capacity of the at least one second server for the secondary volume; and
migrating the data from the current volume to the secondary volume, the activated new volume remaining available for receiving and responding to the post-migration I/O requests during the migration of the data.

5. The computer-implemented method of claim 4, further comprising:
   deallocating one or more primary resources of the at least one first server hosting the current volume.

6. The computer-implemented method of claim 1, wherein the current volume and a mirror volume are on different servers, the mirror volume providing the data for the current volume.

7. The computer-implemented method of claim 1, wherein the request comprises a Web service request through an application programming interface (API).

8. A system for managing shared resources, comprising:
   at least one processor; and
   memory including instructions that, when executed by the at least one processor, cause the system to:
      receive a request to resize a current volume comprising data on at least one first server;
      create, in response to the request and on at least one second server, a new volume operable at a specified rate of input/output (I/O) operations per second (IOPS);
      migrate the data from the current volume to the new volume;
      receive, in the current volume, an I/O user request for the data;
      respond to the I/O user request from the current volume using at least one portion of the data from the current volume with the new volume being unavailable for user access during the migration, the at least one portion of the data previously migrated out of the current volume and remaining available in the current volume for responding to the I/O user request; and
      activate the new volume for receiving and responding to post-migration I/O requests associated with the data migrated out of the current volume.

9. The system of claim 8, wherein the request comprises a change in one or more operational parameters of the at least one first server hosting the current volume, and wherein the change causes the one or more computer systems to initiate the request to resize the current volume.

10. The system of claim 9, wherein the one or more operational parameters comprise one or more of: a volume data size, a data storage type, a committed rate of IOPS, throughput, bandwidth, or a geographical location.

11. The system of claim 8, wherein the instructions when executed further cause the system to:
   determine the at least one second server having at least the resized capacity for a secondary volume;
   allocate at least a portion of the resized capacity of the at least one second server for the secondary volume; and
   migrate the data from the current volume to the secondary volume, the activated new volume remaining available for receiving and responding to the post-migration I/O requests during the migration of the data.

12. The system of claim 11, wherein the instructions when executed further cause the system to:

deallocate one or more primary resources of the at least one first server hosting the current volume.

13. The system of claim 8, wherein the current volume and a mirror volume are on different servers, the mirror volume providing the data for the current volume.

14. The system of claim 8, wherein the request comprises a Web service request through an application programming interface (API).

15. A non-transitory computer-readable storage medium including instructions that, when executed by at least one processor of a computing device, cause the computing device to:
- receive a request to resize a current volume comprising data on at least one first server;
- create, in response to the request and on at least one second server , a new volume operable at a specified rate of input/output (I/O) operations per second (IOPS);
- migrate the data to the new volume;
- receive, in the current volume, an I/O user request for the data;
- respond to the I/O user request from the current volume using at least one portion of the data from the current volume with the new volume being unavailable for user access during the migration, the at least one portion of the data previously migrated out of the current volume and remaining available in the current volume for responding to the I/O user request; and
- activate the new volume for receiving and responding to post-migration I/O requests associated with the data migrated out of the current volume.

16. The non-transitory computer-readable storage medium of claim 15, wherein the request comprises a change in one or more operational parameters of the at least one first server hosting the current volume, and wherein the change causes the one or more computer systems to initiate the request to resize the current volume.

17. The non-transitory computer-readable storage medium of claim 16, wherein the one or more operational parameters comprise one or more of: a volume data size, a data storage type, a committed rate of TOPS, throughput, bandwidth, or a geographical location.

18. The non-transitory computer-readable storage medium of claim 15, wherein the instructions when executed further cause the computing device to:
- determine the at least one second server having at least the resized capacity for a secondary volume;
- allocate at least a portion of the resized capacity of the at least one second server for the secondary volume; and
- migrate the data from the current volume to the secondary volume, the activated new volume remaining available for receiving and responding to the post-migration I/O requests during the migration of the data.

19. The non-transitory computer-readable storage medium of claim 18, wherein the instructions when executed further cause the computing device to:
- deallocate one or more primary resources of the at least one first server hosting the current volume.

20. The non-transitory computer-readable storage medium of claim 15, wherein the current volume and a mirror volume are on different servers, the mirror volume providing the data for the current volume.

* * * * *